INVENTOR
Martin N. Robertson
BY
ATTORNEYS

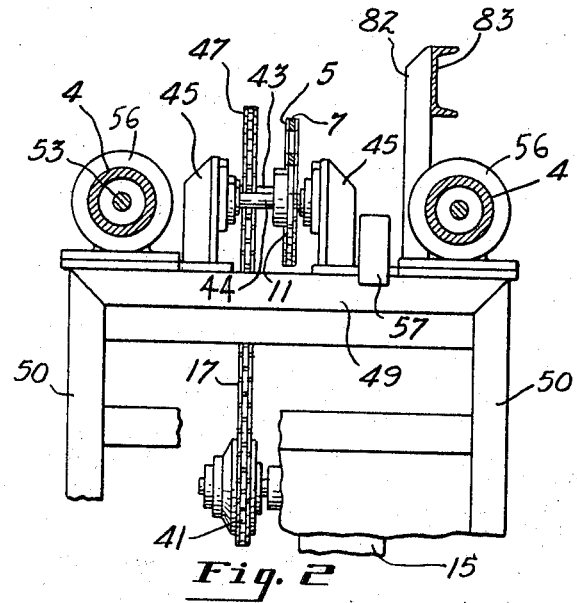
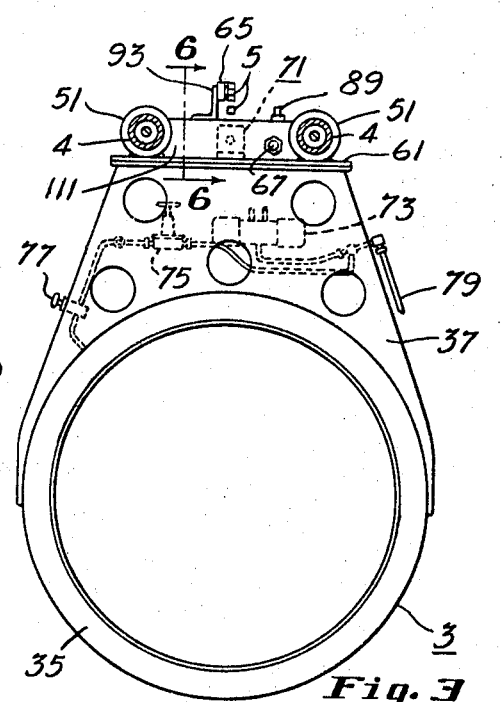
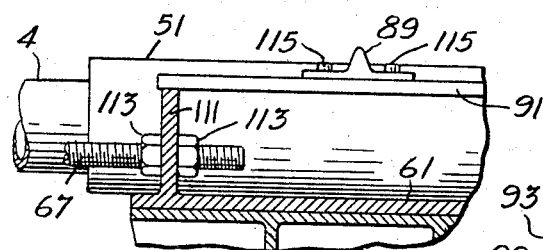
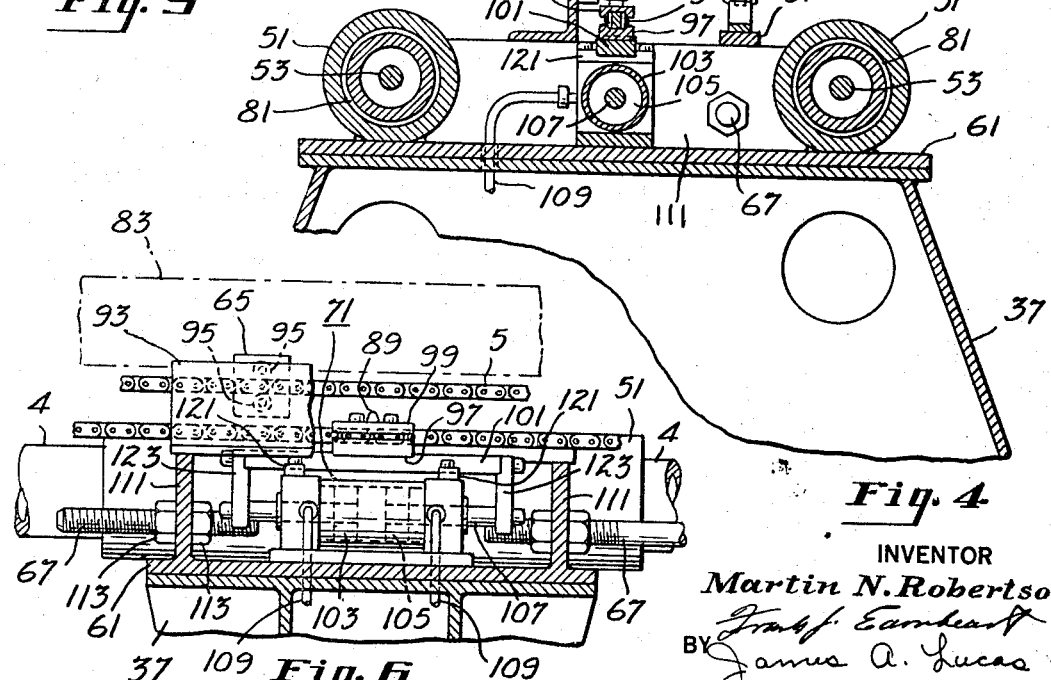

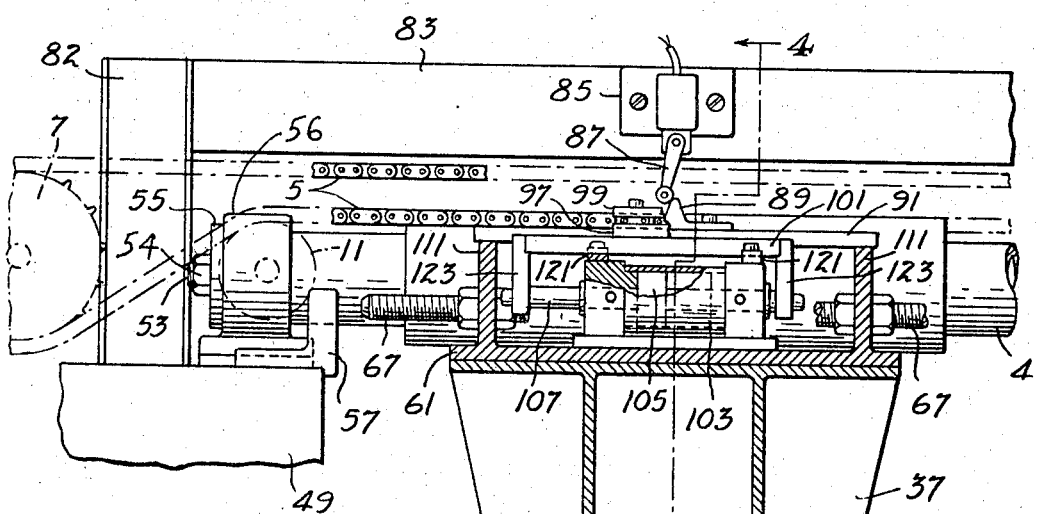
Fig. 7
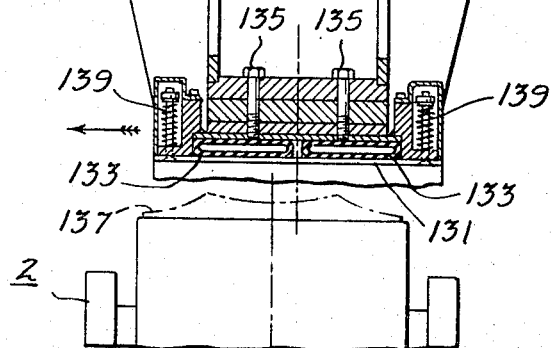
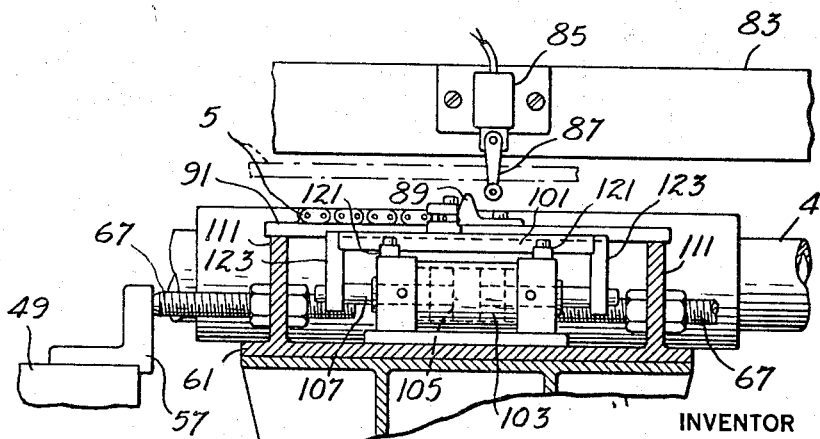
Fig. 8

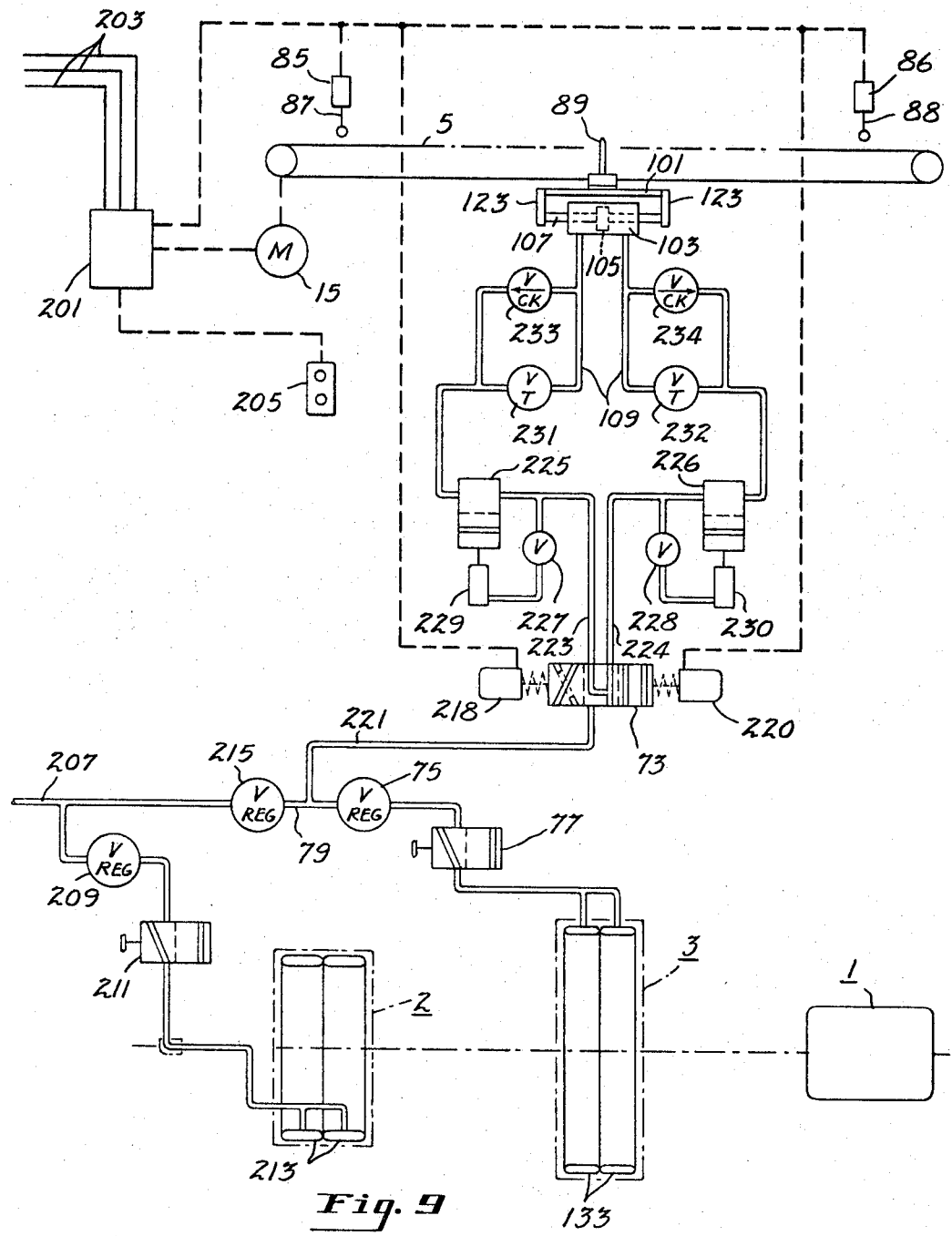

United States Patent Office 3,442,746
Patented May 6, 1969

3,442,746
ANNULUS POSITIONING DEVICE
Martin N. Robertson, Akron, Ohio, assignor to The General Tire & Rubber Company, a corporation of Ohio
Filed Dec. 6, 1965, Ser. No. 511,762
Int. Cl. B29h *17/22, 17/02*
U.S. Cl. 156—396                            11 Claims

ABSTRACT OF THE DISCLOSURE

In a tire building machine in which an annular transfer ring is used to transfer tire components, for example, the tread and breaker assembly, from one tire building operation or drum to another, means are provided to insure accurate positioning of the transfer ring with respect to the building operation. This positioning means comprises a piston and cylinder mechanism engaged with the transfer ring and adapted to make incremental adjustments in the positioning of the transfer ring with respect to the tire building drum or other equipment used in the operation.

---

Pneumatic tires are generally classified as bias-ply tires or radial-ply tires, depending upon the nature of their construction. In the construction of radial-ply tires a carcass, consisting of one or more plies of elastomerized fabric, is built upon a generally cylindrical drum with the fabric cords running from bead to bead in a radial or nearly radial direction, i.e., in a direction which is generally parallel to the axis of the drum. Thereafter, one or more breakers are wrapped around the crown portion of the carcass. These breakers, which provide lateral stability for the tire, consist of closely spaced elastomerized parallel cords, either textile or wire, which desirably extend in a circumferential or nearly circumferential direction around the carcass of the tire.

After the breakers are applied, the tread and sidewall portions are wrapped around the carcass over the breakers and are stitched into place, after which the tire is placed in a suitable mold and is cured.

After the breakers have been wrapped around the carcass, the low circumferential angle of the cords in the breakers precludes any appreciable increase in the diameter of the carcass. Thus, the practice commonly used in the production of bias-ply tires, of first assembling the carcass plies, breakers, and tread into a flat cylindrical band and then shaping the tire into toric shape, has found only limited applicability in the production of radial-ply tires. Instead, a preferred approach has been to build the carcass and shape it into a torus before wrapping the breakers thereearound. Thus, the breakers do not undergo any appreciable stretching.

A number of tire building machines have been designed for the purpose of building radial tires, most of them involving the construction of the carcass upon an inflatable bladder or the like, which bladder is initially cylindrical in shape and is then expanded radially outwardly to transform the carcass into a torus. While the carcass is in this shape, the breakers and the tread are then applied and stitched into place after which the tire is removed from the building machine and is cured in a suitable mold. One such machine, claimed and described in S.N. 423,442 filed Jan. 5, 1965 on behalf of the assignee of the present invention, utilizes two axially aligned building drums, each mounted on the end of a rotatable shaft. The first drum, the surface of which consists of three inflatable elastomeric bladders, is used to construct the carcass and to incorporate the beads therein. The three bladders are all axially aligned, the two outer bladders being used to turn the ends of the carcass plies around inextensible bead rings, and the central bladder serving to deform the completed carcass to toric shape. An inextensible breaker and tread are assembled on the second drum. A transfer mechanism, comprising an annular transfer ring, movable upon a pair of overhead rails, is used to grip the exterior of the assembled tread and breaker and to move it from the second drum to a position surrounding the carcass on the first drum. With the tread and breaker assembly thus positioned, the central bladder is inflated to move the carcass into contact with the assembled tread and breaker. The grip of the ring on the assembly is released and the transfer mechanism is then moved to a neutral position midway between the two drums, after which the tire is removed from the drum and is cured.

The transfer mechanism moves from one drum to the other on the overhead rails by means of a motor and chain drive. As the mechanism moves into position around one or the other of said two drums, a cam on the mechanism trips a limit switch. The limit switch de-energizes the motor and the transfer mechanism comes to a stop, this movement being limited by the mechanism coming into contact with an appropriate abutment over one of the drums. Because of the inerita within the motor and the weight of the transfer mechanism, the mechanism tends to continue moving even after the motor is de-energized. Thus, it may strike the abutment with sufficient force to cause it to bounce or rebound to a certain extent. Alternatively, it is possible for the mechanism to come to rest prior to its contacting said abutment. Consequently, the placement of the transfer mechanism over either of the drums tends to be somewhat inaccurate. This results in a slight misalignment of the tire components during the construction of the tire thereby leading to a poorly-constructed and unbalanced tire.

It is an object of this invention to provide a means for precisely locating a transfer ring around a tire building drum to obtain more uniformity in the construction of tires.

Another object of this invention is to utilize a piston and cylinder arrangement to accurately position and hold a transfer ring in its proper location around the drum or drums utilized in the construction of a pneumatic tire.

Yet another object of this invention is to use pneumatic pressure with a piston and cylinder to precisely locate and hold a tread and breaker transfer mechanism during the various tire building operations.

These and other objects will become apparent in light of the following description and drawings in which:

FIGURE 2 is a cross-sectional end view taken along lines 2—2 of FIGURE 1 showing the motor and driving mechanism for the transfer ring;

FIGURE 3 is an elevation taken along lines 3—3 of FIGURE 1 showing the transfer mechanism mounted on a pair of overhead rails;

FIGURE 4 is a detailed, partially sectioned close up of the upper portion of the transfer mechanism taken along lines 4—4 of FIGURE 7;

FIGURE 5 is a view similar to that of FIGURE 6 but with various parts omitted for clarification;

FIGURE 6 is an enlarged view, partially in cross section, taken along lines 6—6 of FIGURE 3;

FIGURE 7 is a sectional view showing the transfer mechanism over the tread and breaker assembly drum after the limit switch has been tripped;

FIGURE 8 shows the transfer mechanism after being accurately positioned over said drum; and FIGURE 9 is a schematic arrangement showing the electrical and pneumatic controls for the transfer ring, the breaker and tread assembly drum, and the novel positioning mechanism.

Figure 1:
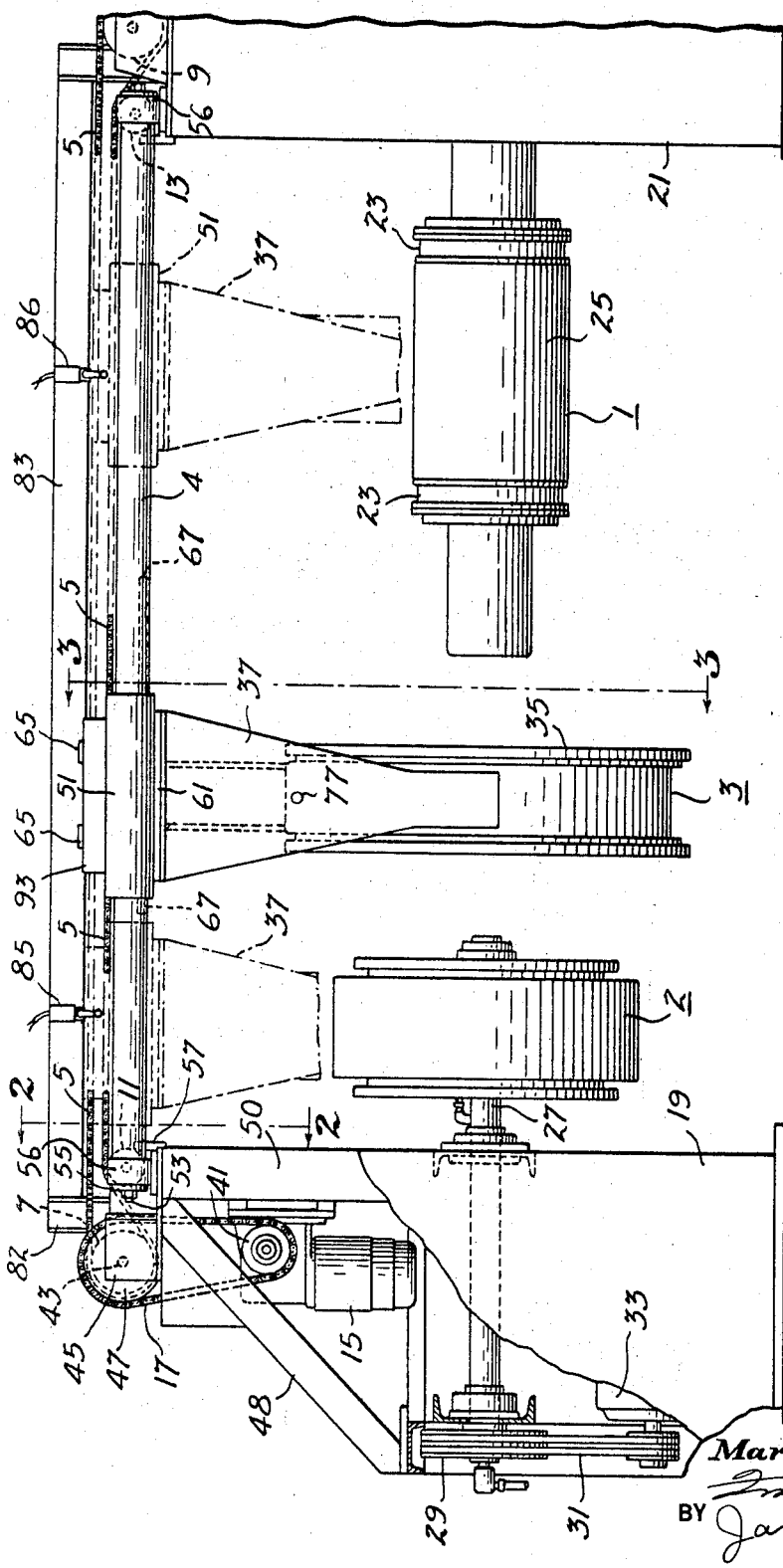
FIGURE 1 is a frontal view, partially cut away, showing one type of tire building apparatus for which the invention is applicable wherein a transfer mechanism is mounted on overhead rails and is adapted to move from a tread and breaker assembly drum to a tire carcass shaper.

In its broadest aspect, this invention relates to a tire building or assembly machine which includes an annular transfer ring for delivering a tread and breaker assembly from a first location to a second location in the assembly operation, improved by the provision of means for accurately positioning and holding said transfer ring at said first and second locations, said positioning means being independent of the means for moving said ring from one position to another in the assembly operation.

Referring now to FIGURE 1, two drums are shown, a carcass shaping drum or shaper 1 and a tread and breaker assembly drum 2. Located between the two drums is a transfer mechanism 3 adapted to transfer an annular tread and breaker assembly from the assembly drum 2 to a position coaxially surrounding the shaping drum 1. The transfer mechanism is adapted to move along two tubular overhead rails 4 and is connected to the ends of a chain 5 (shown partially in outline) movable about sprockets 7, 9 and over idler sprockets 11, 13. Means such as motor 15 and chain 17 rotate the sprocket 7 which in turn drives the chain 5 to move the transfer mechanism between the drum 2 and the shaper 1. Each end of the two overhead rails 4 is secured within an annular rail support 56 which in turn is securely mounted to one of the housings 19 and 21 which contain the pneumatic and electrical controls for the tread and breaker assembly drum 2 and the carcass shaping drum 1, respectively.

Also traversing the space between the two housings 19 and 21 is an overhead channel member 83 which is supported at either end by vertical support members 82. A pair of limit switches 85, 86 are mounted on said channel member. Vertical supports 50, braces 48, and other structural framework within each of the respective housings 19, 21 serve to support the overhead rails and other related equipment.

The shaping drum 1 is attached to the end of a shaft (not shown) which is connected to suitable rotating means within housing 21. The expander consists of a pair of bead seats 23 separated by a cylindrical surface composed of a suitable elastomeric material 25. Means are provided for introducing air into the interior of the shaper to urge said elastomeric material 25 radially outwardly while concomitantly moving the bead seats 23 toward one another. This is preferably accomplished by the use of a screw shaft provided with two sets of threads of opposing pitch. Each of the bead seats 23 communicates with one set of threads. Upon rotation of said screw shaft, while restraining said bead seats from rotating, the seats are moved axially toward or away from one another.

When building large truck tires and the like, it is customary to assemble the carcass upon a flat drum and to then transfer the carcass from the drum to this shaper. However, in the production of smaller tires such as passenger car tires, a carcass building and expanding drum of the type described and claimed in the above-mentioned application, S.N. 423,442, may be used in place of the flat drum and the separate shaper.

The tread and breaker assembly drum 2 is mounted on one end of a shaft 27. A pulley 29 is mounted to the other end of the shaft and is connected by a belt 31 to an appropriate source of power such as motor 33. The cylindrical surface of the drum 2 is composed of an elastomeric material surrounding a plurality of spring biased segments which can be cooperatively moved radially out or in to increase or decrease the diameter of the drum. In the tire building operation, the drum diameter is expanded until it is approximately the same as that which the carcass will assume in the completed tire. The breaker strip or strips are then wrapped around the cylindrical surface followed by the application of the tread. The details of construction of a drum of this type are found in the above-mentioned patent application.

The transfer mechanism 3 consists of an annular ring 35 connected by a suitable structural framework 37 to two annular channels or sleeves 51 which ride upon the tubular rails 4. A plurality of rigid axially elongated rectangular elements are positioned in side by side relationship around the interior surface of the ring. A pair of inflatable tubular bladders are located between these elements and the ring. Inflation of the bladders urges the elements radially inwardly to decrease the effective diameter within the ring. When the transfer mechanism is positioned around the tread and breaker assembly on the drum 2, inflating the bladders causes the elements to move into gripping contact with the outer surface of the tread. The diameter of the drum 2 is then reduced to leave the annular tread and breaker assembly supported within the ring 35. The transfer mechanism 3 is then moved from its position around the drum 2, to a position around the shaper 1, both of these positions being shown in outline in FIGURE 1. Upon deflation of the bladders within the ring 35, the rectangular elements, which are spring biased, move radially outwardly to their retracted position thus releasing their grip upon the tread and breaker assembly. The details of this transfer ring are described in the aforesaid application, S.N. 423,442.

The arrangement of the drive mechanism is shown in FIGURE 2 which is the view taken along lines 2—2 of FIGURE 1. An electric motor 15, connected by a worm gear to sprocket 41 is bolted to support 50. A chain 17 passes around this sprocket 41 and a second sprocket 47 mounted upon a shaft 43. A second sprocket 7 is also mounted upon the shaft 43. A long chain 5, the two ends of which are attached to the transfer mechanism, passes around said sprocket 7 and over a sprocketed idler wheel 11 mounted on shaft 44. This shaft, as well as the shaft 43, are held between bearing brackets 45.

The two overhead rails 4 are supported at each end within an annular rail support 56. A tie rod 53, within each sleeve, extends the full length of said rails 4 and serves to anchor each rail in place. An abutment 57 is welded or otherwise attached to frame 49 which also supports the sleeves 56 and the brackets 45. The frame is supported by structural members 50. Vertical member 82 supports one end of the channel member 83 and is itself supported on the framework 49.

Referring now to FIGURE 3, there is seen a frontal view of the transfer mechanism 3 showing the annular ring 35, the framework 37 holding the ring, and the rails 4 on which the mechanism moves. On top of the framework 37 is a platform 61 on which are mounted two sleeves 51 which slide upon said rails 4. Also mounted on said platform is a chain guide mount 65 to which the ends of chain 5 are securely attached. Between the two sleeves are a pair of parallel, spaced-apart vertical cross members 111 securely mounted on said platform. An angle iron 93, extending across the top of the cross members 111, serves as a support for chain guide mount 65 to which the ends of chain 5 are securely attached. A trip cam is also mounted atop said cross members. A stop rod 67 extends through each cross member and is adapted to contact one of the abutments over each housing.

A piston and cylinder assembly 71 is mounted upon the platform 61 between the two cross members 111. Mounted on the framework 37 are various controls including a solenoid valve 73, regulating valve 75, and a manual valve 67. These, in turn, are connected by a conduit 79 to a suitable source of compressed air.

FIGURE 4 is a detailed close-up of a portion of the transfer mechanism showing the various components located on top of platform 61. Sleeves 51 are mounted upon guide rods 4, the inner surface of the sleeves provided with a low friction lining 81 such as bronze or the like. An elongated channel 83 is suspended above the transfer mechanism and is supported at either end on top of the equipment housing. A limit switch 85 is connected to the channel 83 above the tread and breaker drum and is provided with a contacting arm 87 depending downwardly therefrom. A second limit switch is attached to the other end of the channel 83 over the shaper. A cam 89 is mounted on a bar 91 which is secured to the two cross members 111 (one of which is shown in FIGURE 4) and is positioned so as to contact the arm of the limit switch as the transfer mechanism traverses the rails. The chain guide mount 65 is attached to an angle iron 93 which is mounted on the cross members 111 on top of platform 61. Extending outwardly from said mount 65 are a pair of rotary chain guides 95 through which the upper loop of the chain 5 passes. The lower loop of the chain is held securely between a bracket clamp 99 and a bracket tie bar 97, the latter being connected to a bar 101 slidably mounted between a pair of blocks 121 on the top of a cylinder 103. Within this cylinder is a piston 105 connected to a piston rod 107. A line 109 connects one side of the piston through a valve system to a source of compressed air. A similar line is connected to the cylinder on the other side of the piston.

FIGURE 5 is a view, simplified for clarity, showing one of the stop rods and the cam which serves to trip the limit switches. Sleeve 51 is mounted on platform 61 and is adapted to slide on rail 4. Bar 91 extends across and is connected to a pair of vertical cross members 111, one of which is shown. Cam 89 is secured to the bar 91 by suitable means such as bolts 115.

The stop rod limits the movement of the transfer mechanism at the end of its travel and therefore determines where the mechanism will be located in reference to the building drums.

Referring now to FIGURE 6, some further details of the novel positioning means of this invention are shown. The transfer mechanism is provided with a pair of adjustable stop rods 67, one extending through each vertical cross member 111 and each threadedly adjustable to locate the final position of the transfer mechanism over the assembly drum or the shaper drum. The upper loop of chain 5, as previously mentioned, passes between chain guides 95 attached to guide mount 65. The lower loop of the chain is secured between the chain bracket 97 and clamp 99. The chain bracket, in turn, is welded or otherwise secured to bracket tie bar 101 which slides in blocks 121. The ends of the tie bar are connected to the ends of the piston rod 107 by bracket 123. Piston 105, attached to rod 107, is mounted within the cylinder 103. A pair of lines 109, each connected to a system of valves, serve to introduce air under pressure into the cylinder on one side or the other of the piston or, alternatively, to vent the air from said cylinder.

Referring now to FIGURES 7 and 8, the operation of the apparatus as described in the present invention is shown, it being remembered that the fundamental purpose of said invention is to accurately position, in the axial direction, a transfer ring around a breaker and tread assembly drum, or around a carcass building and/or shaping drum. FIGURE 7 shows the transfer mechanism after it has moved along rails 4 to a point where the cam 89 has contacted the lever 87 of limit switch 85. As the arm 87 is contacted, the circuit is deenergized and the transfer mechanism comes to a standstill.

As previously stated, but not shown, the annular transfer ring contains a plurality of segments 131 forming the interior surface of the ring. A pair of circumferentially extending inflatable bladders 133 are connected by appropriate means to a source of pressurized air. Inflation of the bladders 133 causes the segments 131 to be biased radially inwardly. Upon deflation of the bladders, springs 139 bias the elements 131 radially outwardly to increase the effective diameter of the ring.

Referring now to the operation of the novel centering device, reference is again made to FIGURE 7 wherein the cam 87 on the transfer mechanism is shown having tripped the limit switch 85 to thereby halt the movement of the mechanism. Inasmuch as the stop rod 67 has not contacted the abutment 57, it can be seen that the mechanism is not centered over the drum. However, when the limit switch 85 is tripped, this activates a solenoid switch which in turn opens a spring-biased solenoid valve to feed air, under pressure, into the left side of cylinder 103. The air pressure exerts a force against the left-hand side of the piston and against the end of the cylinder, thus urging these two apart. The piston is connected by rod 107, end brackets 123, and bracket 101 to chain 5 which is precluded from movement by the braking action of motor 15 and the worm gear (FIGURE 1). The cylinder, however, is attached to the platform 61 which is free to move on the rails 4. Therefore, the force of the air pressure serves to move the transfer mechanism to the left until the stop rod 67 contacts abutment 57 as shown in FIGURE 8.

The air pressure then holds the transfer mechanism in this position while the assembled tread and breaker are removed from the drum 2 and are gripped within the transfer ring. This is accomplished by initially inflating the bladders 133 to urge the segments 131 radially inwardly into contact with the outer surface of the tread and thereafter contracting the diameter of the drum 2 to leave the assembly supported within the ring. The motor 15 is then activated to move the transfer mechanism from the drum 2 to the shaper during which the left-hand side of the cylinder 103 is vented to the atmosphere. As it moves over the shaper, the mechanism trips another limit switch which activates a second solenoid switch which in turn opens the other side of the solenoid valve to thereby center the tread and breaker over the tire carcass disposed on the shaper.

Referring now to FIGURE 9, there is shown a schematic of the pneumatic and electrical controls for the transfer mechanism, with particular emphasis being placed upon the operation of the novel positioning device. Briefly, the positioning device, as previously described in detail, consists of a piston rod 107 to which is attached a piston 105 within cylinder 103. The piston rod is secured to chain 5 by a tie bar 101 and a pair of brackets 123. Two limit switches 85, 86 with arms 87, 88 depending therefrom communicate with a control box 201 which is connected by wires 203 to a suitable electrical power supply. A pushbutton switch box 205 contains two buttons. By pushing the proper button, the transfer mechanism can be made to move to the left or to the right as desired.

Compressed air is fed in through line 207 and is divided, part of it passing through regulating valve 209 and manual valve 211 to the bladders 213 of the breaker and tread building drum 2. The air in the other branch passes through another regulating valving 215 after which the line is divided, one branch passing through yet another regulating valve 75 and a manual valve 77 to the bladders 133 within the transfer ring 3. Branch 221 leads to a solenoid valve 73 which is controlled by two solenoid switches 218, 220, connected respectively to one of the limit switches 85, 86.

As the transfer mechanism moves to the left toward the drum 2, the cam 89 contacts and trips lever 87 of limit switch 85. This de-energizes the motor 15 and at the same time activates the appropriate solenoid switch 218 which opens the solenoid to connect line 223 with the source of pressurized air. Time-delay valve 225 is actuated upon the passage of air through valve 227 and operating cylinder 229. The air then passes through a throttling valve 231 which slowly feeds air into the left-hand side of the cylinder 103 to move the cylinder and the transfer mechanism to the left.

The air pressure is maintained in the cylinder until the appropriate button of switch 205 is pushed to cause the mechanism to move away from the drum 2. When this occurs, the solenoid switch 218 is de-energized permitting the spring return within the solenoid valve 73 to open both sides of said valve. Check valve 233, which is spring biased in the closed position as long as air pressure is maintained on the line, then opens to vent the cylinder to the atmosphere.

As the transfer mechanism moves into position over the shaper 1, limit switch 86 is tripped to activate solenoid switch 220 to feed air through time-delay valve 226, and throttling valve 232 into the right-hand side of cylinder 103 in the same manner as previously described. The mechanism is thereby centered over the shaper and is held in that position until the appropriate button or switch is pressed.

It is obvious that various modifications and alterations can be made in the construction of this apparatus and the sequence of the operations thereof without departing from the scope of this invention. For instance, the air cylinder, rather than the piston rod, can be connected to the chain 5 in which case the piston rod is immovably fastened to the frame of the transfer mechanism. Hydraulic rather than pneumatic pressure can be used to actuate the piston and cylinder. Also, changes in the types and arrangement of the valves and the location of the various components can be made without departing from the scope of the invention.

The bore of the cylinder and the stroke of the piston therein, as well as other dimensional features of the centering mechanism, can be varied without affecting the operation of the machine, it being understood that the size and operational characteristics of the components must be adequate to accomplish the intended purpose.

It should further be understood that the transfer ring can be moved from one location to the other by means other than a chain drive, and this includes hand movement, movement on a track mounted on the floor or the like, etc. Furthermore, manual switches rather than limit switches can be used to terminate the movement of the transfer ring, after which the appropriate controls are activated to ensure accurate positioning of the transfer ring. Moreover, a mechanical or other type of holding mechanism can assist or replace the pneumatic holding means after the transfer mechanism has been centered.

This invention can be used in other tire building operations such as the building of bands and the like, and can be used with other apparatus where there is a necessity of accurately positioning components relative to one another.

These and other modifications can be made without departing from the fundamental concepts of this invention which are covered by the appended claims.

What is claimed is:

1. In combination with a tire building machine, including at least one building drum, an annular transfer ring arranged to be moved to a position surrounding said drum, and drive means to move said ring into said position, the improvement comprising means for accurately positioning said transfer ring around said drum, said means comprising a cylinder and a piston, one of which is immovably connected to said transfer ring and the other of which is connected to said drive means, and means responsive to a signal, for pressurizing the cylinder on one side of the piston to move said piston relative to said cylinder to thereby transmit movement to said transfer ring, and means to stop the relative movement of the piston within the cylinder when the ring is accurately positioned around the building drum.

2. In combination with a tire building machine having an expandable and collapsible tread and breaker assembly drum, a tire carcass shaping drum, and an annular transfer ring adapted to move a tread and breaker assembly from said assembly drum to said shaping drum along a fixed path therebetween, drive means for moving said transfer ring along said fixed path and limit switches to disengage said drive means when said ring reaches a position surrounding the assembly drum or said shaping drum, the improvement comprising a cylinder, a piston therein connected to a piston rod, one of said cylinder and said piston rod immovably connected to said transfer ring and the other connected to said drive mechanism, means for pressurizing the cylinder on one side of the piston to move said piston relative to said cylinder and to correspondingly transmit movement to said transfer ring, and means to stop the relative movement of the piston within the cylinder when the ring is accurately positioned around said assembly drum or said shaping drum.

3. The improvement according to claim 2 wherein air under pressure is used to move the piston within the cylinder.

4. The improvement according to claim 3 wherein each limit switch is connected to a solenoid switch which connects the cylinder to a source of air pressure.

5. The combination according to claim 2 wherein said transfer ring moves along overhead rails connecting said assembly drum with said shaping drum, and said drive means comprises a motor and a chain geared to said motor, said chain passing around a sprocket at either end of said rails and connected to said transfer ring.

6. A machine according to claim 5 wherein said cylinder is connected to said transfer ring and said piston rod is connected to said chain.

7. A radial tire building machine including an annular transfer ring for delivering a tread and breaker assembly from an assembly drum to a position surrounding a tire carcass disposed on a shaping drum, said transfer ring adapted to move along a pair of overhead tubular rails between said assembly drum and said shaping drum, a chain mechanism connected to a motor and adapted to move said transfer ring between said assembly drum and said shaping drum, and a limit switch over each drum adapted to be contacted by a portion of said transfer ring to de-energize said chain drive mechanism when said ring is positioned around the respective drum, the improvement comprising means for accurately positioning said transfer ring around the assembly drum or around the shaping drum after said chain drive mechanism is de-energized, said means including a pneumatic cylinder, a piston movably disposed within said cylinder and attached to a rod, one of said cylinders and rods being immovably attached to said transfer ring and the other of said cylinder and rod attached to the chain, an air line connected to one side of said cylinder for introducing air into the cylinder to move the piston in one direction and an air line connected to the other side of the cylinder for introducing air therein to move the piston in the other direction, the movement of the piston causing movement of the transfer ring, and means comprising a stop rod and an abutment for limiting the amount of said movement.

8. A machine according to claim 7 wherein each air line is connected to one side of a common solenoid valve, said valve having a pair of solenoid switches, each switch responsively connected to one of said limit switches to open the valve to connect the respective air line to a source of pressurized air upon tripping of said limit switch.

9. A machine according to claim 8 wherein each air line includes a throttle valve intermediate said solenoid valve and said cylinder adapted to feed the air at a predetermined rate into one side of said cylinder.

10. A machine according to claim 9 including a time-delay valve intermediate said solenoid valve and said throttling valve to provide a time delay between tripping of the limit switch and the introduction of air under pressure into one side of said cylinder.

11. A machine according to claim 10 including means to vent the cylinder when the motor is activated to move the transfer ring away from the drum.

References Cited

UNITED STATES PATENTS

| | | | |
|---|---|---|---|
| 2,253,781 | 8/1941 | Haase et al. | 156—111 |
| 2,319,643 | 5/1943 | Sternad et al. | 156—396 |
| 2,822,027 | 2/1958 | Hollis | 156—127 |
| 3,200,967 | 8/1965 | Delzanno | 198—24 X |
| 2,871,912 | 2/1959 | Kraft | 156—126 |

HAROLD ANSHER, *Primary Examiner.*

U.S. Cl. X.R.

156—111, 127